United States Patent
Bauer et al.

(10) Patent No.: US 10,339,959 B2
(45) Date of Patent: Jul. 2, 2019

(54) PERCEPTION BASED MULTIMEDIA PROCESSING

(71) Applicant: Dolby Laboratories Licensing Corporation, San Francisco, CA (US)

(72) Inventors: Claus Bauer, Beijing (CN); Lie LU, San Francisco, CA (US); Mingqing Hu, Beijing (CN); Jun Wang, Beijing (CN); Poppy Crum, Oakland, CA (US); Rhonda Wilson, San Francisco, CA (US); Regunathan Radhakrishnan, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 99 days.

(21) Appl. No.: 15/321,741

(22) PCT Filed: Jun. 24, 2015

(86) PCT No.: PCT/US2015/037484
§ 371 (c)(1),
(2) Date: Dec. 22, 2016

(87) PCT Pub. No.: WO2016/003735
PCT Pub. Date: Jan. 7, 2016

(65) Prior Publication Data
US 2017/0133039 A1  May 11, 2017

Related U.S. Application Data
(60) Provisional application No. 62/030,940, filed on Jul. 30, 2014.

(30) Foreign Application Priority Data

Jun. 30, 2014 (CN) .......................... 2014 1 0320668

(51) Int. Cl.
*G06K 9/62* (2006.01)
*G10L 25/54* (2013.01)
*G10L 25/03* (2013.01)

(52) U.S. Cl.
CPC ............ *G10L 25/54* (2013.01); *G06K 9/6259* (2013.01); *G06K 9/6261* (2013.01); *G10L 25/03* (2013.01)

(58) Field of Classification Search
CPC ....... G10L 25/54; G10L 25/03; G06K 9/6259; G06K 9/6261
(Continued)

(56) References Cited

U.S. PATENT DOCUMENTS 6,374,225 B1 * 4/2002 Hejna, Jr. ................ G09B 5/00
704/200
7,375,731 B2  5/2008 Divakaran
(Continued)

FOREIGN PATENT DOCUMENTS

WO  2005/093752  10/2005

OTHER PUBLICATIONS

Unsupervised Learning, http://en.wikipedia.org/wiki/Unsupervised_learning, Jan. 23, 2017.
(Continued)

*Primary Examiner* — Hemant S Patel
(74) *Attorney, Agent, or Firm* — Geoffrey T. Staniford; Staniford Tomita LLP

(57) ABSTRACT

Example embodiments disclosed herein relate to perception based multimedia processing. There is provided a method for processing multimedia data, the method includes automatically determining user perception on a segment of the multimedia data based on a plurality of clusters, the plurality of clusters obtained in association with predefined user perceptions and processing the segment of the multimedia data at least in part based on determined user perception on the segment. Corresponding system and computer program products are disclosed as well.

4 Claims, 4 Drawing Sheets

(58) Field of Classification Search
USPC .......................................................... 700/94
See application file for complete search history.

(56) References Cited

U.S. PATENT DOCUMENTS

| | | | |
|---|---|---|---|
| 7,426,301 | B2 | 9/2008 | Porikli |
| 7,697,792 | B2 | 4/2010 | Keating |
| 7,912,565 | B2 | 3/2011 | Tazime |
| 7,949,050 | B2 | 5/2011 | Xu |
| 8,358,856 | B2 | 1/2013 | Loui |
| 8,370,869 | B2 | 2/2013 | Paek |
| 8,768,706 | B2* | 7/2014 | Schubert ................. G10L 15/22 704/235 |
| 9,118,807 | B2* | 8/2015 | Bright-Thomas ...... H04N 7/152 |
| 9,218,821 | B2 | 12/2015 | Lu |
| 2003/0045954 | A1* | 3/2003 | Weare ............... G06F 17/30743 700/94 |
| 2004/0143434 | A1 | 7/2004 | Divakaran |
| 2005/0285937 | A1 | 12/2005 | Porikli |
| 2006/0222078 | A1* | 10/2006 | Raveendran ....... H04N 21/2365 375/240.16 |
| 2007/0245400 | A1* | 10/2007 | Paek ................. G06F 17/30858 725/142 |
| 2008/0298643 | A1 | 12/2008 | Lawther |
| 2016/0078879 | A1 | 3/2016 | Lu |

OTHER PUBLICATIONS

He, X. et al "Locality Preserving Projections" NIPS 2003.
Grira, N. et al "Unsupervised and Semi-Supervised Clustering: A Brief Survey" Aug. 15, 2005, in A Review of Machine Learning Techniques for Processing Multimedia Content, Report of the MUSCLE European Network of Excellence, pp. 1-12.
Weinberger, K. et al "Distance Metric Learning for Large Margin Nearest Neighbor Classification" in NIPS 2006, pp. 1473-1480.
Zhou, D. et al "Learning with Local and Global Consistency" Advances in Neural Information Processing Systems, Mar. 2004, pp. 321-328.
Choi, I. et al "Objective Measurement of Perceived Auditory Quality in Multichannel Audio Compression Coding Systems" J. Audio Eng. Soc., vol. 56, No. 1/2, Jan./Feb. 2008, pp. 3-17.
Fenton, S. et al "Objective Measurement of Music Quality using Inter-Band Relationship Analysis" AES Convention Paper 8394, presented at the 130th Convention, May 13-16, 2011, London, UK.
Cavallaro, A. et al "Interaction Between High-Level and Low-Level Image Analysis for Semantic Video Object Extraction" EURASIP Journal on Applied Signal Processing 2004 Hindawi Publishing Corporation, pp. 786-797.
Wang, Y. et al "Classification-Based Multi-Dimensional Adaptation Prediction for Scalable Video Coding Using Subjective Quality Evaluation" IEEE Transactions on Circuits and Systems for Video Technology, vol. 15, Issue 10, Oct. 2005, pp. 1270-1279.
Congyan, L. et al "Perception-Oriented Prominent Region Detection in Video Sequences" Informatica 29, 2005, pp. 253-260.
Coates, A. et al "An Analysis of Single-Layer Networks in Unsupervised Feature Learning" Proc. of the 14th International Conference on Artificial Intelligence and Statistics, Jan. 1, 2011, pp. 1-9.
Nasierding G. et al "Clustering Based Multi-Label Classification for Image Annotation and Retrieval" IEEE International Conference on Systems, Man and Cybernetics, Oct. 11, 2009, pp. 4514-4519.
Krizhevsky, Alex "Learning Multiple Layers of Features from Tiny Images" Apr. 8, 2009, pp. 1-58.
Jain, A. et al "Statistical Pattern Recognition: A Review" IEEE Transactions on Pattern Analysis and Machine Intelligence, vol. 22, No. 1, Jan. 2000, pp. 4-37.

\* cited by examiner

PERCEPTION BASED MULTIMEDIA PROCESSING

CROSS-REFERENCE TO RELATED APPLICATIONS

This application claims the benefit of priority to Chinese Patent Application No. 201410320668.4 filed 30 Jun. 2014 and U.S. Provisional Patent Application No. 62/030,940 filed 30 Jul. 2014, the content of each are hereby incorporated by reference in their entirety.

FIELD OF THE INVENTION

Example embodiments disclosed herein generally relate to multimedia processing, and more specifically, to multimedia data processing based on user perceptions.

BACKGROUND

A large number of multimedia (audio and/or video) data processing algorithms have been developed for various purposes. Typically, a multimedia processing algorithm may have several parameters to be tuned in order to achieve the best performance. At present, selections of parameter values for a given algorithm tend to be determined by a small number of algorithm developers. However, it is noted that the parameter value preference of a given algorithm may be content specific. That is, a fixed parameter value may be suitable for a certain set of content but not for all the possible multimedia content. As a result, different multimedia data may need to be processed in different ways. For example, a dialog enhancement method is usually applied on movie content. If it is applied on music in which there are no dialogs, it may falsely boost some spectral sub-bands and introduce heavy timbre change and perceptual inconsistency. Similarly, if a noise suppression method is applied on music signals, strong artifacts will be audible.

In light of the above facts, several solutions have been developed to dynamically adapt the configuration of multimedia processing algorithms as a function of the processed multimedia content. For example, in the audio field, there has been presented a method to automatically steer the audio processing algorithms and select the most appropriate parameter values based on the content categories (such as speech, music, and movie) of the processed audio signal.

However, in some cases, steering multimedia processing by classifying multimedia content into predefined categories may not optimize user experience. It would be appreciated that these categories such as speech, music, and movie do not necessarily link the perturbations in the underlying algorithm with the preferred user experience. For example, some speech content and music content may have similar or same effects on the human perceptions and therefore should be processed with similar processing parameters. In this event, processing them with different parameters may instead put negative impact on the user experience.

In view of the foregoing, there is a need in the art for a solution capable of processing multimedia content with optimized experience in terms of human perceptions.

SUMMARY

In order to address the foregoing and other potential problems, the Example embodiments disclosed herein proposes a method and system for perception-based multimedia processing.

One embodiment provides a method for processing multimedia data. The method includes automatically determining user perception on a segment of the multimedia data based on a plurality of clusters, the plurality of clusters obtained in association with predefined user perceptions and processing the segment of the multimedia data at least in part based on determined user perception on the segment.

Another example embodiment provides a system for processing multimedia data. The system includes a perception determining unit configured to automatically determine user perception on a segment of the multimedia data based on a plurality of clusters, the plurality of clusters obtained in association with predefined user perceptions and a multimedia processing unit configured to process the segment of the multimedia data at least in part based on determined user perception on the segment.

Through the following description, it would be appreciated that in accordance with example embodiments disclosed herein, the correlation between perceptual experiences/preferences of human users with lower-level features of the content (such as dynamic range, cross-correlation, and bandwidth) are modeled and utilized. Perceptually motivated clusters are generated by using psychophysical testing paired with statistical clustering techniques. In this way, the common semantic categories such as speech, music, and movie are replaced with a more direct link between the underlying processing algorithm and the user experience. Example embodiments also enable automatic dynamic signal processing in a content/user specific way that would be robust to novel content outside of previously identified content categories.

DESCRIPTION OF DRAWINGS

Through the following detailed description with reference to the accompanying drawings, the above and other objectives, features and advantages of example embodiments will become more comprehensible. In the drawings, several embodiments will be illustrated in an example and non-limiting manner, wherein.

DESCRIPTION

Figure 1:
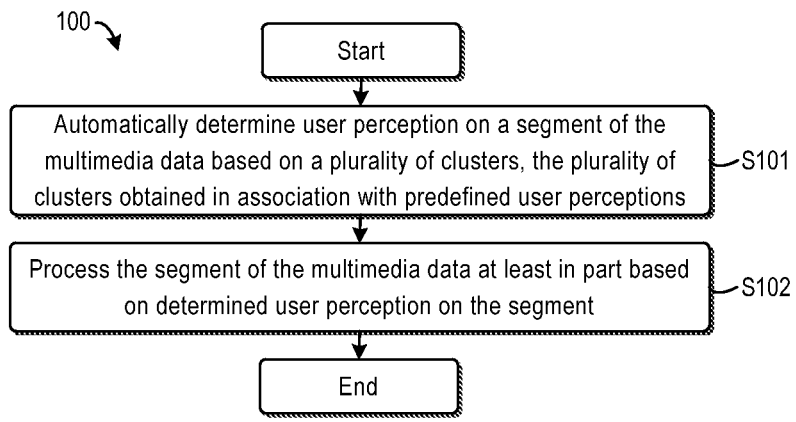
FIG. 1 is a flowchart of a method for processing multimedia data in accordance with example embodiments disclosed herein.

Principles of the Example embodiments disclosed herein will now be described with reference to various example embodiments illustrated in the drawings. It should be appreciated that depiction of these embodiments is only to enable those skilled in the art to better understand and further implement the Example embodiments disclosed herein, not intended for limiting the scope in any manner.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

FIG. 1 shows a flowchart of a method 100 for processing multimedia data in accordance with example embodiments disclosed herein. Multimedia data may be represented in any suitable form and may include, but is not limited to, audio, video and/or any other media content.

As shown, the method 100 is entered at step S101, where user perception on a segment of the multimedia data is automatically determined based on a plurality of clusters. Specifically, in accordance with example embodiments disclosed herein, the plurality of clusters are obtained in association with predefined user perceptions on training multimedia data.

In some embodiments, the predefined clusters as used at step S101 include a plurality of perceptual clusters. As used herein, the term "perceptual cluster" refers to a group of multimedia content or data on which a human may have a similar or same perception or preference, with regard to one or more specific multimedia processing algorithms. That is, the perceptual clusters are generated by directly clustering training multimedia data according to predefined user perceptions on the training multimedia data. In a specific embodiment, the data in a perceptual cluster may be processed by the same set of multimedia processing algorithms with the same processing configurations.

The user perceptions may be obtained in various manners. For example, in some embodiments, it is possible to invite human users to experience a training set of multimedia data, for example, listening to audio and/or watching videos. Then the users are asked specific questions to try to capture subjective preferences or reactions related to the training multimedia data. For example, the users may indicate their emotion, mood, and/or any other aspects of perception after experiencing each piece of content in the training set. It is also possible to collect information about human preference on how to configure specific multimedia signal processing algorithms, which influence how the multimedia content is rendered and experienced. Then the training multimedia data is labeled according to the answers provided by the users. Based on the perception labeling, the training multimedia data may be clustered to form the perceptual clusters.

Additionally or alternatively, in some other embodiments, user perceptions in the form of perceptual properties and/or quality of multimedia data may be detected by applying pre-defined objective metrics. Various objective audio quality measurements have been proposed in international standards and may be applied. Examples include, but are not limited to, PEAQ (Perceptual Evaluation of Audio Quality), objective speech quality assessment, objective measurement of perceived audio quality in multi-channel audio compression coding systems, and the like. Such objective metrics may implicitly reflect the general user perceptions and may be derived in an automated, computer-based way. Accordingly, the multimedia data in the training set may be clustered based on one or more of the objective metrics.

In addition to or instead of the perceptual clusters, the predefined clusters as used at step S101 may include a plurality of data clusters. As used herein, the term "data cluster" refers to a set of multimedia data having similar or the same low-level signal features. Examples of the signal features include, but are not limited to, dynamic range, cross-correlation, bandwidth, and the like. Generally, in such embodiments, multimedia data are first represented by a specific feature(s) derived from a frequency or time domain representation of the multimedia data (typically frame by frame). Then a data clustering algorithm is applied to the feature representations to cluster the training multimedia data. For example, unsupervised clustering algorithms may be used. In clustering, the multimedia signals that are close in the feature space will be grouped as a data cluster. Specifically, in accordance with example embodiments disclosed herein, in addition to the low-level signal features, the user perceptions on the multimedia data are also taken into account, either when generating the data clusters or after the generation. Example embodiments in this regard will be discussed later.

At step S101, for any target segment of input multimedia data, the user perceptions on the segment is automatically determined based on the predefined perceptual clusters and/or data clusters. Specifically, it is possible to select one or more of the perceptual and/or data clusters to which the segment belongs to or relates. Then, the predefined user perception associated with the selected cluster(s) may be used to derive the perception on the segment. Example embodiments will be discussed later.

As shown in FIG. 1, the method 100 then proceeds to step S102 where the segment of the multimedia data is processed at least in part based on determined user perception on the segment. Generally, association between each type of user perception and corresponding configuration(s) of the processing algorithm is determined and stored in advance. Specifically, in some embodiment, the predefined user perceptions per se may be represented by the corresponding processing configuration(s), for example, in the form of a set of recommended values for processing parameters.

As such, at step S102, the user perception of the target segment determined at step S101 may be used to retrieve the corresponding configuration(s) for multimedia processing. For example, in some embodiments, the appropriate processing algorithm may be selected for the segment based on the determined user perception. Alternatively or additionally, the determined user perception of the segment is used to configure the processing algorithm, for example, by selecting most suitable values of one or more parameters, or by selecting execution mode(s).

Figure 2:
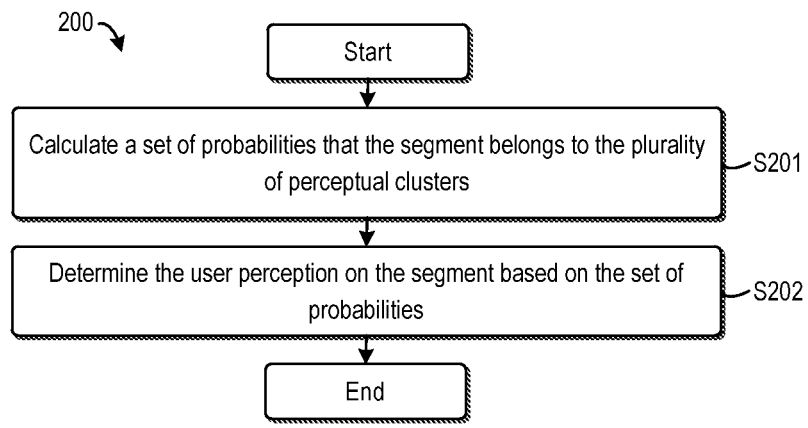
FIG. 2 is a flowchart of a method for determining user perception on a target segment of the multimedia data in accordance with example.

Now some specific examples will be described to illustrate how to determine user perception on a segment of the multimedia data at step 101. FIG. 2 shows a flowchart of a method 200 for determining the user perception on a target segment of input multimedia data. It would be appreciated that the method 200 is a specific implementation of step S101.

In the embodiments discussed in connection with FIG. 2, the plurality of predefined clusters as used at step S101 include perceptual clusters $P_1, \ldots, P_N$ that are generated by clustering training data based on user perceptions, as discussed above. In such embodiments, for a specific target segment x of the input multimedia data, the probabilities $p_1, \ldots, p_N$, indicating the likelihood that the segment x belongs to each perceptual cluster, are calculated at step S201.

Figure 3:
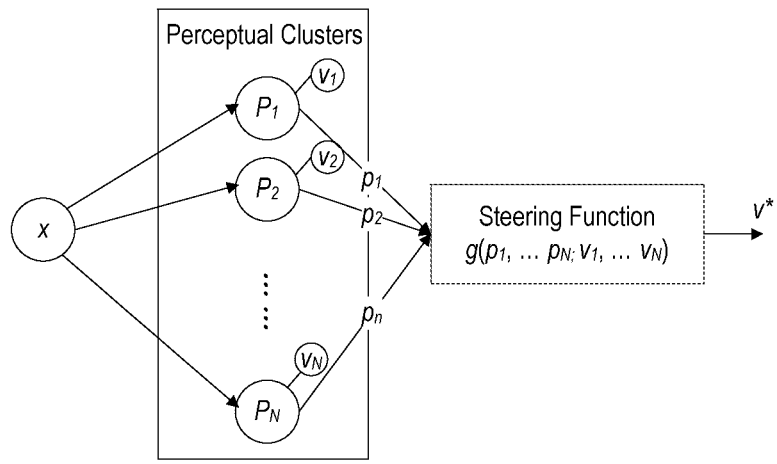
FIG. 3 is a schematic diagram of determining user perception based on perceptual clusters in accordance with an example embodiment.

The probabilities $p_1, \ldots, p_N$ may be calculated in various ways. In some embodiments, the probabilities are calculated in relation to the perceptual clusters, as shown in FIG. 3. In such embodiments, the data within any perceptual cluster may be represented by a Gaussian Mixture Model (GMM) in a feature space. Accordingly, each of the probabilities $p_1, \ldots p_N$ may be calculated, for example, as the posterior probability as follows:

$$p_i = p(P_i | x) = \frac{p(x|P_i)p(P_i)}{\sum_{i=1}^{N} p(x|P_i)p(P_i)} \quad (1)$$

where x represents feature representation of the target segment, $P_i$ represents the ith perceptual cluster, $p(x|P_i)$ represents the likelihood that the segment x belongs to the cluster $P_i$, $p(P_i)$ represents the prior probability, and $p(P_i|x)$ represents the final posterior probability.

In one embodiment, the likelihood $p(x|P_i)$ may be directly calculated in the feature space. However, it would be appreciated that in some cases, the feature space may not represent the perceptual similarity well. In other words, similar signals in the feature space may not mean to share the similar perceptually-preferred parameter values. Therefore, in an alternative embodiment, a "perceptual space" is constructed and utilized. As used herein, the term "perceptual space" refers to a space in which a distance between any two signals represents the perceptual similarity of these two signals. By transforming the signal of the segment into the perceptual space and calculating the probabilities in the perceptual space, it is possible to have a better estimation of the probability $p_i$ and subsequently the most appropriate parameter(s).

To transform the feature space to the perceptual space, in one embodiment, a transformation matrix A is determined by minimizing the following objective function:

$$\sum_{i,j} (y_i - y_j)^2 w_{ij} \quad (2)$$

where $y_i = A^T x_i$ represents the vector in the transformed space, and $W = [w_{ij}]$ represents a matrix defining the perceptual similarity of the signal $x_i$ and $x_j$. The coefficients $w_{ij}$ may be obtained from the perceptual clusters. For example, in one embodiment, $w_{ij}$ is set to 1 if $x_i$ and $x_j$ are allocated into the same perceptual cluster and set to 0 otherwise. Alternatively, the coefficients $w_{ij}$ may be also set to a value between 0 and 1 based on the similarity of the preferred parameter values corresponding to $x_i$ and $x_j$.

In this way, it ensures that if two signals $x_i$ and $x_j$ are perceptually similar (that is, with a large $w_{ij}$), their corresponding projected versions $y_i$ and $y_j$ are close in the perceptual space. Since the coefficients $w_{ij}$ are derived based on the user perceptions, the original feature representation of the segment may be transformed into the perceptual space where neighboring signals have perceptually similar attributes and hence result in similar processing settings.

In one embodiment, the solution to minimize the objective function (2) is addressed by Locality Preserving Projections (LPP), and more specifically, by solving the following Generalized Eigenvalue problem:

$$XLX^T a = \lambda X D X^T a \quad (3)$$

where the matrix L and D (a diagonal matrix) are derived from $W = [w_{ij}]$ and may be defined as $D_{ii} = \Sigma_j w_{ji}$ and $L = D - W$, X represents the matrix by packing up the features $x_i$ in the original feature space, and the obtained a is a column vector forming the transforming matrix A, and represents a projection direction. Besides the linear transformation as described above, kernel LPP may be applied as well to obtain a nonlinear space transformation.

Instead of directly projecting the original feature space to a perceptual space, in an alternative embodiment, large margin nearest neighbor (LMNN) may be used to preserve the perceptual similarity. LMNN learns a Mahanalobis distance metric specifically for k-nearest neighbor, with the goal that the k-nearest neighbors always belong to the same class while examples from different classes are separated by a large margin. In this embodiment, the optimized distance metric shown in the following equation may be used to calculate the probabilities defined in equation (1), for example, by replacing the original Euclidean distance in the Gaussian distribution by the optimized distance.

$$d(x_i, x_j) = (x_i - x_j)^T M (x_i - x_j) \quad (4)$$

It would be appreciated that since the learned matrix M is symmetric and may be decomposed into $A^T A$, it is equivalent to mapping the original feature space to a new space with the mapping transformation A.

Specifically, for those applications with low computational complexity requirement, the predefined perceptual clusters may be stored in a hash table with a specific hash function. Generally, hash functions may be used to locate similar data in a database with regard to a query. That is, a hash function is designed to map similar data to hash values that differ by at most m, where m is a small integer (for example, 1 or 2), so that similar data can be located in the same bucket, or in nearby buckets. A typical application of hashing is the fingerprinting algorithms, which are used to search similar audio signals in a large collection. It is possible to simplify the calculation of $p(P_i|x)$ with hashed cluster data. For example, in one embodiment, the perceptual clusters located in the same bucket as the multimedia data being processed or the nearby buckets are considered. That is, the probabilities in relation to these perceptual clusters are calculated. For the other perceptual clusters, the probabilities may be directly set to 0. Alternatively, the nearest cluster can be searched in the bucket where the query is located.

Given the probabilities $p_1, \ldots, p_N$, at step S202, the user perceptions on the segment is determined on the calculated $p_1, \ldots, p_N$. For example, in some embodiments, the predefined user perception associated with the perceptual cluster with the largest probability may be determined as the perception on the segment being processed. Alternatively, several perceptual clusters with the largest probabilities may be selected and their associated predefined user perceptions are combined to derive the perception on the target segment.

As discussed above, in some embodiments, the user perceptions may be represented by a corresponding processing configuration $v_i$. For example, $v_i$ may represent a set of values for the processing parameters. As a result, each perceptual cluster is also associated with the corresponding configuration $v_i$, as shown in FIG. 3. In such embodiments, a steering function $g(p_1, \ldots p_N; v_1, \ldots v_N)$ may be applied to determine the optimal configuration $v^*$ for the target segment x. For example, in one embodiment, the configuration corresponding to the largest probability may be selected. That is, the steering function is defined as:

$$g(p_1, \ldots, p_N; v_1, \ldots, v_N) = v_{i^*} \qquad (5)$$

wherein $i^* = \arg\max_i(p_1)$. Alternatively, the configuration for the segment being processed may be determined by a weighted average of $v_i$. In this embodiment, the steering function is defined as:

$$g(p_1, \ldots, p_N; v_1, \ldots, v_N) = \sum_{i=1}^{N} p_i v_i \qquad (6)$$

Any other suitable steering functions are possible as well.

It would be appreciated that it is generally required that there is a compact but diverse set of training multimedia data when generating the perceptual clusters $P_1, \ldots, P_N$. The "compactness" is needed to reduce the expensive manual efforts of perceptual labeling, and the "diversity" is needed to guarantee the data coverage and reduce the risk of unseen data in the steering process. For example, if the training data set cannot cover a diverse content, a new signal being processed may not find a proper perceptual cluster it matches. However, manual selection of a compact but diverse training set is sometimes challenging.

In order to make better tradeoff between the compactness and diversity of the training data, in some embodiments, a plurality of data clusters that are generated based on one or more low-level signal features of the multimedia data are used in combination with the perceptual clusters. Specifically, suppose that there are M data clusters $C_1, \ldots, C_M$ and N perceptual clusters $P_1, \ldots, P_N$. In training phase, the data clusters and perceptual clusters may be generated by two independent clustering processes that are executed on respective set of training multimedia data. In one embodiment, the size of training data set for generating the data clusters is larger than that of training data set for generating the perceptual clusters. This would be beneficial since the generation of data clusters may be done without human intervening and a larger training data set would facilitate achieving better data coverage. As a result, in some instances, the number of data clusters may be greater than that of the perceptual clusters, namely, M>N.

Figure 4:
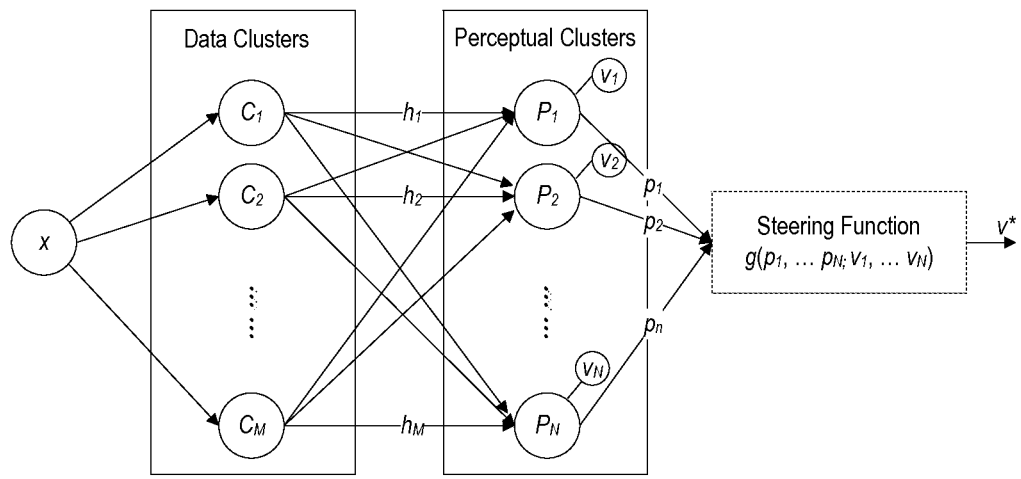
FIG. 4 is a schematic diagram of determining user perception based on perceptual clusters in accordance with another example embodiment.

In such embodiments, at step S201, the probabilities $p_1, \ldots, p_N$ are calculated based on both data clusters and perceptual clusters. As shown in FIG. 4, for a target segment x of multimedia data, a set of probabilities $h_1, \ldots, h_M$ indicating the likelihood that the processed segment x belongs to the data clusters $C_i$ ($i=1, \ldots, M$) are calculated. For example, these probabilities may be calculated based on GMM posterior probabilities as shown in equation (1). Then the probabilities $p_1, \ldots, p_N$ that the segment x belongs to and the perceptual clusters $P_1, \ldots, P_N$ are calculated at least in part based on the probabilities $h_1, \ldots, h_M$.

To this end, in one embodiment, a space defined by the plurality of data clusters is used as an "anchor space." It would be appreciated that in the space defined the data clusters, the probabilities $h_1, \ldots, h_M$ may be considered as the representation of the segment x. That is, the vector $(h_1, \ldots, h_M)$ represents the coordinate of the segment x in the space. In the meantime, the plurality of perceptual clusters $P_1, \ldots, P_N$ are mapped into the anchor space. By using the feature representation of the multimedia signals in each of the perceptual clusters, the mapping is straightforward and the same GMM posterior probability may be applied again. For each perceptual cluster, a set of mapped value $q_1, \ldots, q_M$ may be obtained. As such, the perceptual cluster $P_i$ may be represented as the vector $(q_1, \ldots, q_M)$ in the anchor space. Then the probability $p_i$ that the segment x belong to the perceptual cluster $P_i$ may be calculated based on the similarity between the vectors $(h_1, \ldots, h_M)$ and $(q_1, \ldots, q_M)$.

Various approaches may be utilized to derive the similarity between $(h_1, \ldots, h_M)$ and $(q_1, \ldots, q_M)$. For example, in one embodiment, it is possible to use a Gaussian-based similarity which is defined as follows:

$$p_i = \frac{1}{\sqrt{2\pi}\,\sigma} \exp\left\{-\frac{\sum_j (h_j - q_j)^2}{2\sigma^2}\right\} \qquad (7)$$

Alternatively, a sigmoid-based function may be used which is defined as:

$$p_i = \frac{1}{1 + \exp\left\{-\frac{\sum_j (h_j - q_j)^2}{2\sigma^2}\right\}} \qquad (8)$$

In the above equations (7) and (8), the variance $\sigma^2$ may be manually tuned, and the obtained probabilities $p_i$ may be further normalized, for example. Furthermore, the Euclidean distance $(\Sigma_j(h_j - q_j)^2)$ as applied in the exponential component may be replaced by any other distance metrics. For example, the symmetric KL divergence as follows may be used:

$$D_{KL}(h \| q) = \sum \left(h_j \log \frac{h_j}{q_j} + q_j \log \frac{q_j}{h_j}\right) \qquad (9)$$

As another alternative, it is possible to use the Dirichlet-based distance as follows:

$$D(h, q) = 2 - 2 \times \left[\frac{\Gamma\left(\sum_{j=1}^{M} h_j\right) \Gamma\left(\sum_{j=1}^{M} q_j\right)}{\prod_{j=1}^{M} \Gamma(h_j) \prod_{j=1}^{M} \Gamma(q_j)}\right]^{\frac{1}{2}} \times \frac{\prod_{j=1}^{M} \Gamma\left(\frac{h_j + q_j}{2}\right)}{\Gamma\left(\sum_{j=1}^{M} \frac{h_j + q_j}{2}\right)} \qquad (10)$$

Instead of using the space defined by the data clusters as an anchor space, in alternative embodiments, the cluster similarities between the data clusters $C_1, \ldots, C_M$ and the perceptual clusters $P_1, \ldots, P_N$ are calculated. For example, the similarity between a data cluster and a perceptual cluster may be derived from the data (or the corresponding features) within these two clusters, for example, by using a Gaussian function defined by equation (7) or a sigmoid-based function defined by equation (8), with $h_j$ and $q_j$ replaced by the corresponding data features. Again, in order to have a better distance metric, in one embodiment, the LLP and LMNN as described above may be applied to transform the original feature space to a perceptual space or to learn a better metric in the original space.

Then the probabilities $p_1, \ldots, p_N$ are calculated based on the probabilities $h_1, \ldots, h_M$ and the cluster similarities according to a probabilistic model. For example, in one embodiment, the probabilities $p_i$ may be calculated based on Bayesian model as follows:

$$p_i = p(P_i|x) = \Sigma_{j=1}^M p(P_i|C_j)p(C_j|x) = \Sigma_{j=1}^M p(P_i|C_j)h_j \quad (11)$$

where $p(C_j|x)$ represents the probability that the segment x belongs to data cluster $C_j$ (that is $h_j$), and $p(P_i|C_j)$ represents the probability that the data cluster $C_j$ correlates to perceptual cluster $P_i$. The $p(P_i|C_j)$ is calculated from the similarity between $P_i$ and $C_j$, for example, as follows:

$$p(P_i|C_j) = \frac{s(P_i, C_j)}{\sum_{k=1}^N s(P_k, C_j)} \quad (12)$$

where $s(P_i, C_j)$ represents the similarity between the perceptual cluster $P_i$ and the data cluster $C_j$.

By defining a matrix W with $w_{ij} = p(P_i|C_j)$ and two vectors $h = (h_1, \ldots, h_M)^T$ and $p = (p_1, \ldots, p_N)^T$, calculation of probabilities $p_1, \ldots, p_N$ may be done by a simple matrix multiplication:

$$p = Wh \quad (13)$$

Figure 5:
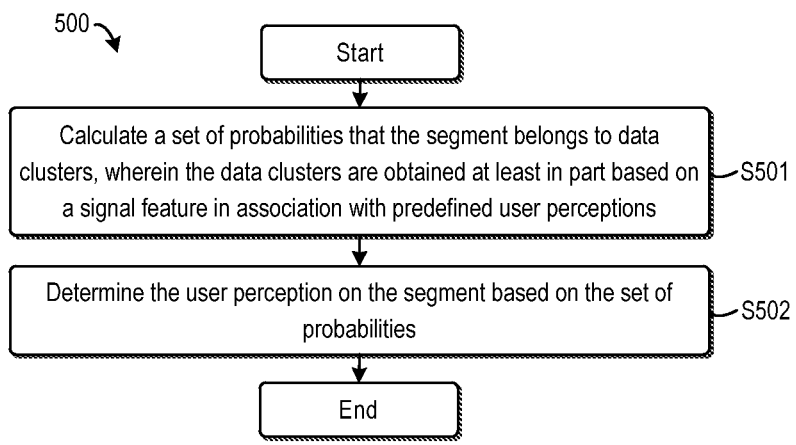
FIG. 5 is a flowchart of a method for determining user perception on a target segment of the multimedia data in accordance with example embodiments.

It can be seen that in the embodiments discussed in connection to FIG. 2, the perception on the given segment is determined at least in part based on predefined perceptual clusters. Alternatively, in other embodiments, the perception may be determined based on data clusters that are injected with the user perceptions in the training phase. FIG. 5 shows a flowchart of such a method 500. It would be appreciated that the method 500 is another kind of implementations of step S101 of the method 100.

In the embodiments discussed in connection with the method 500, the plurality of predefined clusters as used at step S101 includes a plurality of data clusters that are obtained at least in part based on a signal feature(s). For example, in the training phase, a large training set containing a lot of diverse multimedia data may be established to guarantee the diversity/coverage. Then, data clusters may be generated, for example, by unsupervised clustering.

At step S501, probabilities $h_1, \ldots, h_M$ that the segment x belongs to the plurality of data clusters $C_1, \ldots, C_M$ based on a signal feature(s) of the segment. The probabilities may be calculated, for example, based on GMM posterior probabilities as defined in equation (1). Optionally, LLP and LMNN as described above may be applied as well in order to transform the original feature space to a perceptual space or to learn a better metric in the original space. Additionally, in some embodiments, the hash table may be used to speed up the search process.

The probabilities $h_1, \ldots, h_M$ with respect to the data clusters are capable of guiding the perception based multimedia processing because in the embodiments discussed with reference to FIG. 5, the data clusters $C_1, \ldots, C_M$ are each injected with predefined user perceptions (for example, in the form respective processing configurations) in the training phase. The information about user perceptions may be injected into the data clusters in various manners. Two example embodiments will be discussed below with reference to FIGS. 6 and 7, respectively.

Figure 6:
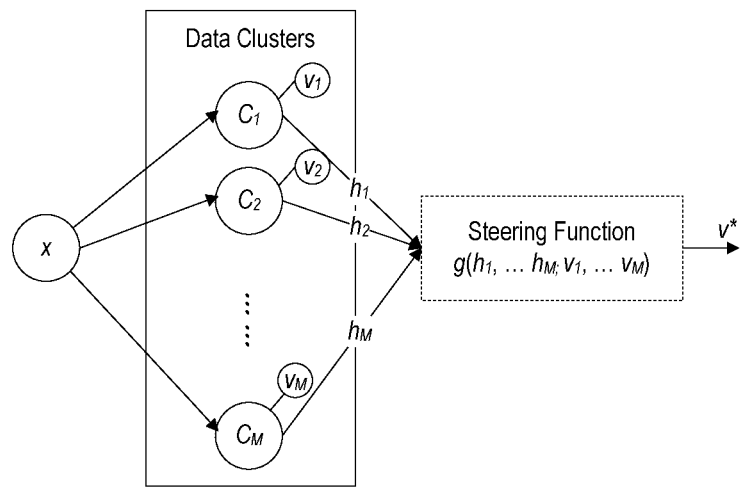
FIG. 6 is a schematic diagram of determining user perception based on data clusters in accordance with an example embodiment.

With reference to FIG. 6, in some embodiments, each data cluster resulted from the data clustering process is explicitly assigned with predefined user perceptions. In one embodiment, after the data clusters are generated, one or more representative signals may be selected from each data cluster for perceptual labeling by human users. The obtained label and/or the preferred processing configuration $v_i$ for the selected representative signal is assigned back to the whole data cluster. As a result, as shown in FIG. 6, the data clusters $C_1, \ldots, C_M$ are associated with the perception-based processing configurations $v_1, \ldots, v_M$, respectively. Additionally or alternatively, the data clusters that are labeled by the same label may be further merged to generate a larger cluster. That is, in the embodiment shown in FIG. 6, the user perception information is injected after the data clusters are generated.

Alternatively, in other embodiments, the predefined user perceptions may be combined into the data clusters in the data clustering procedure. In such embodiments, the data clusters are generated based on not only the signal feature(s) but also one or more perceptual constraints derived from the prior knowledge of the user perceptions. Specifically, in one embodiment, the perceptual constraint may be derived from a plurality of perceptual clusters that are generated based on the predefined user perceptions such as perception labeling. That is, perceptual clustering may be utilized to facilitate generating the perceptual constraints.

Figure 7:
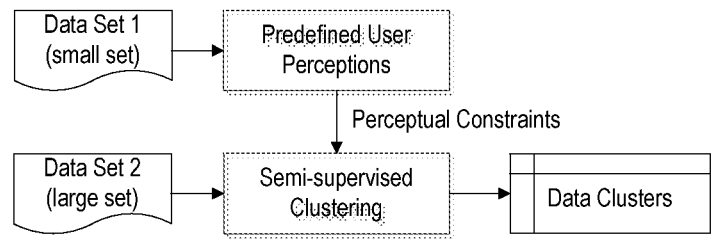
FIG. 7 is a schematic diagram of determining user perception based on data clusters in accordance with another example embodiment.

As shown in FIG. 7, in one embodiment, perceptual clustering may be applied on a relatively small training set of multimedia data ("Data Set 1" in FIG. 7) to obtain perceptual knowledge in the form of perceptual clusters. Then semi-supervised clustering may be applied on a separate, large training set ("Data Set 2" in FIG. 7) to generate the data clusters, with the available perceptual clusters as constraints. In this way, the data clusters are generated by taking the predefined user perceptions into account. Each resulting data cluster is thus correlated with one or more perceptual clusters. For example, if the signals $x_i$ and $x_j$ are allocated into the same data set $C_i$ because these two signals are allocated into the same perceptual cluster $P_j$, then the data cluster $C_i$ is correlated with the perceptual cluster $P_j$. Accordingly, the user perception knowledge (for example, the perception labeling) associated with $P_j$ may be delivered to $C_i$.

It would be appreciated that generation of the data clusters under perceptual constraints may be considered as a semi-supervised clustering procedure. Various approaches may be applied. In one embodiment, a similarity-adapting method is utilized. An existing clustering algorithm using some similarity measure is employed, with the similarity measure adapted to take available perceptual constraints into account. For example, if two sample signals $x_i$ and $x_j$ belong to the same perceptual cluster, then a perceptual constraint may specify that these two signal samples should be clustered into a same data cluster. As an example, the LPP and LMNN as described above may be considered as two adapting methods.

In another embodiment, a search-based method may be adopted. In this embodiment, the clustering algorithm per se is modified so that the labeled perceptual data can be used to bias the search for an appropriate clustering. This can be done in several ways, for example, by including in the cost function a penalty for lack of compliance with the specified constraints. As an example, in one embodiment, a method of semi-supervised clustering based on local and global consistency may be used. A n-by-c label matrix Y is defined, with $Y_{ij}=1$ if $x_i$ is labeled as $y_i=j$ and $Y_{ij}=0$ otherwise. Additionally, a estimation matrix $F=[F_{ij}]$ is defined, where $x_i$ will be labeled as a label $y_i = \mathrm{argmax}_j F_{ij}$, where n represents the number of data and c represents the number of clusters. The clustering may be done, for example, through the following steps:
1. Form the affinity matrix W defined by $W_{ij}=\exp(-|x_i-x_j|^2/2\sigma^2)$ if $i \neq j$ and $W_{ii}=0$;
2. Construct the matrix $S=D^{-1/2}WD^{-1/2}$ in which D is a diagonal matrix with its (i, i)-element equal to the sum of the ith row of W;
3. Iterate $F(t+1)=\alpha SF(t)+(1-\alpha)Y$ until convergence, where a is a parameter in (0.1);
4. Let F* denote the limit of the sequence {F(t)}. Label each point $x_i$ a label $y_i=\mathrm{argmax}_j F_{ij}^*$.

After convergence, $F^*=(1-\alpha)(I-\alpha S)^{-1}Y$ is a direct matrix operation without any iterations. Optionally, in some embodiments, the transformation matrix obtained by LLP or the new metric learned by LMNN can be intuitively applied in the first step above.

Still with reference to FIG. 5, the method 500 then proceeds to step S502, where the user perceptions on the segment are determined on the calculated probabilities $h_1, \ldots, h_M$. It would be appreciated that given the probabilities $h_1, \ldots, h_M$ and the perceptual knowledge associated with the data clusters, the user perceptions on the target segment may be determined, for example, in a similar manner as discussed above with reference to step S202 in the method 200.

Figure 8:
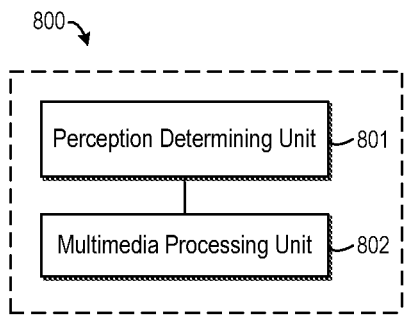
FIG. 8 is a block diagram of a system for processing multimedia data in accordance with example embodiments.

FIG. 8 shows a block diagram of a system 800 for processing multimedia data in accordance with embodiments of the example embodiments disclosed herein. As shown, the system 800 comprises a perception determining unit 801 configured to automatically determine user perception on a segment of the multimedia data based on a plurality of clusters, the plurality of clusters obtained in association with predefined user perceptions. The system 800 further comprises a multimedia processing unit 801 configured to process the segment of the multimedia data at least in part based on determined user perception on the segment.

In some example embodiments, the plurality of clusters at least include a plurality of perceptual clusters that are generated at least in part based on the predefined user perceptions. The system 800 may further comprise: a first probability calculating unit configured to calculate a first set of probabilities that the segment belongs to the plurality of perceptual clusters. The perception determining unit 801 is configured to determine the user perception on the segment based on the first set of probabilities.

In some example embodiments, the system 800 further comprises a signal transforming unit configured to transform a signal of the segment into a perceptual space in which a distance between signals represents perceptual similarity of the signals. In such embodiments, the first probability calculating unit is configured to calculate the first set of probabilities based on the transformed signal of the segment in the perceptual space.

In some example embodiments, the plurality of clusters further include a plurality of data clusters that are generated based on a signal feature. The system 800 further comprises a second probability calculating unit configured to calculate a second set of probabilities that the segment belongs to the plurality of data clusters based on the signal feature of the segment. In such embodiments, the first probability calculating unit is configured to calculate the first set of probabilities at least in part based on the second set of probabilities.

In some example embodiments, the system 800 further comprises a mapping unit configured to map the plurality of perceptual clusters into a space defined by the plurality of data clusters to obtain a set of mapped values, the set of mapped values being representations of the plurality of perceptual cluster in the space. In such embodiments, the first probability calculating unit is configured to calculate the first set of probabilities based on similarity between the second set of probabilities and the set of mapped values.

In some example embodiments, the system 800 further comprises a cluster similarity determining unit configured to determine a set of cluster similarities between the plurality of data clusters and the plurality of perceptual clusters. In such embodiments, the first probability calculating unit is configured to calculate the first set of probabilities based on the second set of probabilities and the set of cluster similarities according to a probabilistic model.

In some example embodiments, the plurality of perceptual clusters are generated from a first training set of multimedia data, and the plurality of data clusters are generated from a second training set of multimedia data, where a size of the second training set being greater than a size of the first training set.

Alternatively, the plurality of clusters include a plurality of data clusters that are obtained at least in part based on a signal feature in association with the predefined user perceptions. The system 800 further comprises a third probability calculating unit configured to calculate a set of probabilities that the segment belongs to the plurality of data clusters at least in part based on the signal feature of the segment. In such embodiments, the perception determining unit 801 is configured to determine the user perception on the segment based on the set of probabilities.

In some example embodiments, the predefined user perceptions are associated with the plurality of data clusters upon generation of the plurality of data clusters. Alternatively, in some example embodiments, the plurality of data clusters are generated based on the signal feature and a perceptual constraint, the perceptual constraint derived from the predefined user perceptions.

In some example embodiments, the system 800 further comprises a configuration retrieving unit configured to retrieve a processing configuration based on the determined user perception on the segment. In such embodiments, the multimedia processing unit 802 is configured to process the segment of the multimedia data using the retrieved processing configuration.

It should be noted that for the sake of clarity, some optional units of the system 800 are not shown in FIG. 8. However, it should be appreciated that the features as described above apply to the system 800. Moreover, the units of system 800 may be hardware modules or software modules. For example, in some example embodiments, the system 800 may be implemented partially or completely with software and/or firmware, for example, implemented as a computer program product embodied in a computer readable medium. Alternatively or additionally, the system 800 may be implemented partially or completely based on hardware, for example, as an integrated circuit (IC), an application-specific integrated circuit (ASIC), a system on chip (SOC), a field programmable gate array (FPGA), and so forth. The scope of the example embodiments disclosed herein are not limited in this regard.

Figure 9:
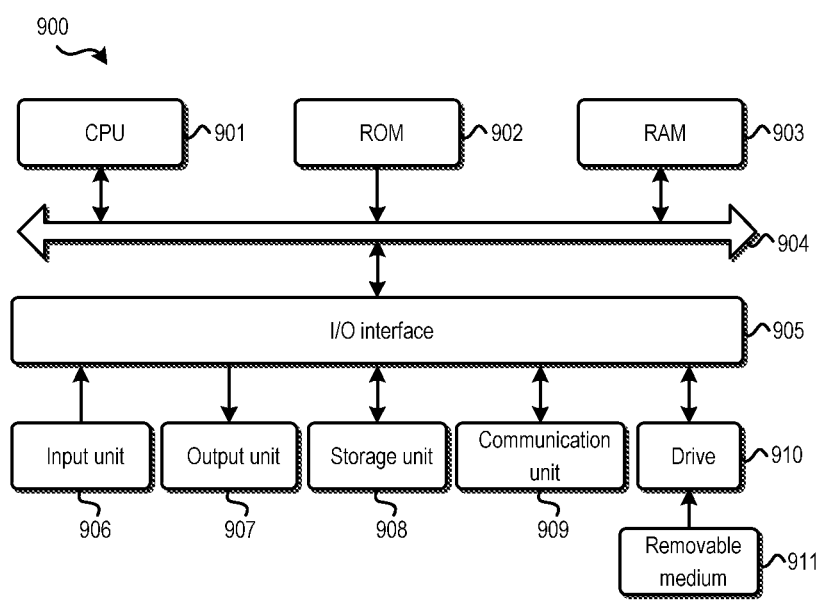
FIG. 9 is a block diagram of an example computer system suitable for implementing example embodiments.

FIG. 9 shows a block diagram of an example computer system 900 suitable for implementing example embodiments disclosed herein. As shown, the computer system 900 comprises a central processing unit (CPU) 901 which is capable of performing various processes in accordance with a program stored in a read only memory (ROM) 902 or a program loaded from a storage unit 908 to a random access memory (RAM) 903. In the RAM 903, data required when the CPU 901 performs the various processes or the like is also stored as required. The CPU 901, the ROM 902 and the RAM 903 are connected to one another via a bus 904. An input/output (I/O) interface 905 is also connected to the bus 904.

The following components are connected to the I/O interface 905: an input unit 906 including a keyboard, a mouse, or the like; an output unit 907 including a display such as a cathode ray tube (CRT), a liquid crystal display (LCD), or the like, and a loudspeaker or the like; the storage unit 908 including a hard disk or the like; and a communication unit 909 including a network interface card such as a LAN card, a modem, or the like. The communication unit 909 performs a communication process via the network such as the internet. A drive 910 is also connected to the I/O interface 905 as required. A removable medium 911, such as a magnetic disk, an optical disk, a magneto-optical disk, a semiconductor memory, or the like, is mounted on the drive 910 as required, so that a computer program read therefrom is installed into the storage unit 908 as required.

Specifically, in accordance with example embodiments disclosed herein, the processes described above may be implemented as computer software programs. For example, example embodiments disclosed herein comprise a computer program product including a computer program tangibly embodied on a machine readable medium, the computer program including program code for performing methods. In such embodiments, the computer program may be downloaded and mounted from the network via the communication unit 909, and/or installed from the removable medium 911.

Generally, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the example embodiments disclosed herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any example embodiments disclosed herein or of what may be claimed, but rather as descriptions of features that may be specific to particular embodiments of particular example embodiments disclosed herein. Certain features that are described in this specification in the context of separate embodiments may also be implemented in combination in a single embodiment. Conversely, various features that are described in the context of a single embodiment may also be implemented in multiple embodiments separately or in any suitable subcombination.

Various modifications, adaptations to the foregoing example embodiments disclosed herein may become apparent to those skilled in the relevant arts in view of the foregoing description, when read in conjunction with the accompanying drawings. Any and all modifications will still fall within the scope of the non-limiting and example embodiments disclosed herein. Furthermore, other example embodiments disclosed herein set forth herein will come to mind to one skilled in the art to which these e example embodiments disclosed herein pertain having the benefit of the teachings presented in the foregoing descriptions and the drawings.

The example embodiments disclosed herein may be embodied in any of the forms described herein. For example, the following enumerated example embodiments (EEEs) describe some structures, features, and functionalities of some aspects of the example embodiments disclosed herein.

EEE 1. A method to steer multimedia processing algorithms comprising perceptual clusters of multimedia signals where a vector of parameters is assigned to each cluster.

EEE 2. The method in EEE 1 where the perceptual clusters are found through psychophysical test or using objective perceptual metrics, and where multimedia signals that are close in relation to a perceptual label/metric are considered as belonging to the same perceptual cluster.

EEE 3. The methods in EEEs 1 and 2, where both the vector of parameters and the perceptual metric may contain or be derived from the values describing at least one of the following: information about human preference on how to configure specific multimedia signal processing algorithms, which influence how the multimedia content is rendered and experienced; subjective information of humans when experiencing the multimedia signals, such as their emotions or mood; automated and computerized tests using specific metrics to derive perceptual properties of multimedia signals.

EEE 4. The methods in EEEs 1-3, where multimedia signals being processed are assigned to one or more a perceptual cluster with an algorithm calculating probabilities that the signal belongs to a specific perceptual cluster, and where an optimal parameter vector is estimated to dynamically steer and configure multimedia processing algorithms.

EEE 5. The method in EEE 4, where the probabilities are computed in a transformed space, for example, by locality preserving projection (LLP), and/or with a perceptual metric based on the perceptual clusters, for example, by large margin nearest neighbor (LMNN).

EEE 6. The method in EEEs 4-5, where the search of the best parameter values and the probability computation can be simplified by a hash search.

EEE 7. A method to steer multimedia processing algorithms comprising data clusters of multimedia signals where a vector of parameters is associated to each cluster.

EEE 8. The method in EEE 7, where the data clusters are found through unsupervised learning algorithms analyzing the feature representation of the multimedia signal.

EEE 9. The methods in EEEs 7 and 8 where the vector of parameters may contain or be derived from the values describing at least one of the following: information about human preference on how to configure specific multimedia signal processing algorithms, which influence how the multimedia content is rendered and experienced; subjective information of humans when experiencing the multimedia signals in a specific data cluster, such as their emotions or mood; automated and computerized tests using specific metrics to derive perceptual properties of multimedia signals.

EEE 10. The methods in EEEs 7-9 where multimedia signals are assigned to one or more data cluster with an algorithm calculating probabilities that the signal belongs to a specific data cluster, and where the optimal parameter vector is estimated to dynamically steer and configure multimedia processing algorithms.

EEE 11. The method in EEE 10, where the probabilities are computed in a transformed space, for example, by locality preserving projection (LLP), and/or with a perceptual metric based on the data clusters, for example, by large margin nearest neighbor (LMNN).

EEE 12. The method in EEEs 10-11, where the search of the best parameter values and the probability computation can be simplified by a hash search.

EEE 13. A method to steer multimedia processing algorithms comprising both data clusters and perceptual clusters, and a mapping function which maps data clusters of multimedia signals to perceptual clusters of multimedia signals.

EEE 14. The method in EEE 13 where the data clusters are found through unsupervised learning algorithms analyzing the feature representation of the multimedia signal.

EEE 15. The method in EEE 13 where multimedia signals that are close in relation to a perceptual metric are considered as belonging to the same perceptual cluster.

EEE 16. The method in EEE 15 where the perceptual metric measures a distance between some or all of the following values: information about human preference on how to configure specific multimedia signal processing algorithms, which influence how the multimedia content is rendered and experienced; subjective information of humans when experiencing the multimedia signals, which further includes social tags provided by humans such as their emotions or, and learnings from the crowd including collaborative filtering techniques for identifying typical audio pieces for a given perception cluster, or vice versa; automated and computerized tests using specific metrics to derive perceptual properties of multimedia signals.

EEE 17. The methods in EEEs 13-16 where specific parameters are assigned to perceptual clusters, and the specific parameters may contain or be derived from the values as listed in EEEs 16.

EEE 18. The method in EEE 17 where the specific parameter values can be used to dynamically steer multimedia processing algorithms.

EEE 19. The method in EEE 18 where multimedia signals are assigned to one or more data cluster using an algorithm calculating probabilities that the signal belongs to a specific data cluster, and mapped to one or more perceptual clusters through the defined mapping function in EEEs 13, and where the optimal parameter vector is estimated to steer multimedia processing algorithms.

EEE 20. The method in EEEs 13 and 19, where a mapping function is computed in the space spanned by the data clusters.

EEE 21. The method in EEEs 13 and 19, where a mapping function is computed based on probabilistic models and a set of cluster similarities between the plurality of data clusters and the plurality of perceptual clusters EEE 22. The method 20-21, where the mapping function can be simplified by a hash search.

EEE 23. A method to steer multimedia processing algorithms comprising perceptual clusters/labels of a set of multimedia signals and comprising learning algorithms to generate data clusters based on the signal feature and a perceptual constraint, with the perceptual constraint derived from the known perceptual clusters/labels.

EEE 24. The method in EEE 23 where multimedia signals that are close in relation to a perceptual metric are considered as belonging to the same perceptual cluster.

EEE 25. The method in EEE 24 where the perceptual metric measures a distance between some or all of the following values: information about human preference on how to configure specific multimedia signal processing algorithms, which influence how the multimedia content is rendered and experienced; subjective information of humans when experiencing the multimedia signals, which further includes social tags provided by humans such as their emotions or mood, and learnings from the crowd including collaborative filtering techniques for identifying typical audio pieces for a given perception cluster, or vice versa; automated and computerized tests using specific metrics to derive perceptual properties of multimedia signals.

EEE 26. The methods in EEEs 23-25 where specific parameters that can be used to steer and configure audio processing algorithms are assigned to perceptual clusters, and the specific parameters may contain or be derived from the values as listed in EEEs 25.

EEE 27. The method in EEEs 23-26 where the learning algorithms are semi-supervised clustering.

EEE 28. The methods in EEEs 23-25 where multimedia signals are assigned to a perceptual clusters using a learning algorithm calculating probabilities that the signal belongs to a specific perceptual cluster, and where the optimal parameter vector is estimated to dynamically steer and configure multimedia processing algorithms.

EEE 29. The method in EEEs 28, where the probabilities are computed in a transformed space, for example, by locality preserving projection (LLP), and/or with a perceptual metric, for example, as learned by large margin nearest neighbor (LMNN).

EEE 30. The method in EEEs 28-29, where the search of the best parameter values or the probability computation can be simplified by a hash search.

It will be appreciated that the example embodiments disclosed herein are not to be limited to the specific embodiments as discussed above and that modifications and other embodiments are intended to be included within the scope of the appended claims. Although specific terms are used herein, they are used in a generic and descriptive sense only and not for purposes of limitation.

We claim:

1. A method to steer multimedia processing algorithms comprising a perceptual clusters of multimedia signals where a vector of parameters is assigned to each cluster and the multimedia signals being processed are assigned to one or more perceptual clusters generated by clustering training data based on subjective user perception based on similar or same perception or preference, wherein an algorithm calculates one or more probabilities that the signal belongs to a specific perceptual cluster, and wherein an optimal parameter configuration of the vector parameters for a target segment of the signal is determined through a steering function that calculates a weighted average of individual probabilities each applied to respective configuration parameters, and further wherein the probabilities of the segment belonging to a perceptual cluster is one of a posterior probably calculated as a Gaussian-based probability (GMM), a locality preserving projection (LPP), or a largest margin nearest neighbor (LMNN).

2. The method of claim 1 wherein the user perception is selected from user mood or experiential data based on actual user derived training data; and further wherein the perceptual clusters are found through psychophysical test or using objective perceptual metrics, and where multimedia signals that are close in relation to a perceptual label/metric are considered as belonging to the same perceptual cluster.

3. The methods of claim 2, wherein both the vector of parameters and the perceptual metric contain or are derived from values describing at least one of the following:
information about human preferences on how to configure specific multimedia signal processing algorithms which influence how the multimedia content is rendered and experienced;
subjective information of humans when experiencing the multimedia signals; and
computerized tests using specific metrics to derive perceptual properties of multimedia signals.

4. The method of claim 3 wherein the optimal parameter configuration as calculated by the following formula for steering function g, probabilities p and processing parameters v:

$$g(p_1, \ldots p_N; v_1, \ldots, v_N) = \sum_{i=1}^{N} p_i v_i.$$

* * * * *